United States Patent
Lam et al.

(10) Patent No.: US 7,177,823 B2
(45) Date of Patent: Feb. 13, 2007

(54) IN-QUEUE JOBS INFORMATION MONITORING AND FILTERING

(75) Inventors: Thanh V. Lam, Hurley, NY (US); Giampaolo Lauria, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 09/992,338

(22) Filed: Nov. 6, 2001

(65) Prior Publication Data

US 2003/0088425 A1    May 8, 2003

(51) Int. Cl.
*G06F 17/30* (2006.01)
*G07G 1/00* (2006.01)

(52) U.S. Cl. ............... 705/10; 705/7; 705/8; 705/9; 358/1.1; 358/1.13; 358/1.14; 358/1.15; 358/1.16; 718/100; 718/102; 718/105; 709/223; 709/224; 709/201

(58) Field of Classification Search ........... 714/46, 714/47; 705/26, 7–10, 11; 709/201, 203, 709/204, 223, 224; 701/207; 715/527; 358/1.13–1.16, 358/1.1; 718/105, 100, 102
See application file for complete search history.

(56) References Cited

U.S. PATENT DOCUMENTS 5,513,994 A    5/1996  Kershaw et al. ............ 434/350

(Continued)

FOREIGN PATENT DOCUMENTS

JP    10069402    3/1998

(Continued)

OTHER PUBLICATIONS

IBM Technical Bulletin (vol. 38, No. 05 May 1995) Intergrated Set of Design Verification Tools.*

(Continued)

*Primary Examiner*—James A Reagan
(74) *Attorney, Agent, or Firm*—Lawrence D. Cutter, Esq.; Kevin P. Radigan, Esq.; Heslin Rothenberg Farley & Mesiti, P.C.

(57) ABSTRACT

A remote monitor technique based on a client/server model is provided for a distributed computing system having a plurality of computing nodes. The remote monitor includes a server application for collecting jobs information on jobs in a queue of the system and a client application for presenting or employing the jobs information. The client application can display the jobs information in a single display window comprising multiple subwindows for various characteristics of the jobs information. Jobs information displayed by the client application can be periodically refreshed. The remote monitor enables a user to monitor in detail jobs of a state defined by the user. The remote monitor can also track usage of preselected filesystems and automatically trims filesystems if usage is higher than a defined threshold.

9 Claims, 8 Drawing Sheets

U.S. PATENT DOCUMENTS

| | | | |
|---|---|---|---|
| 6,014,760 A | 1/2000 | Silva et al. | 714/46 |
| 6,076,174 A | 6/2000 | Freund | 714/47 |
| 6,463,420 B1 * | 10/2002 | Guidice et al. | 705/26 |
| 6,604,124 B1 * | 8/2003 | Archbold | 709/201 |
| 6,826,597 B1 * | 11/2004 | Lonnroth et al. | 709/207 |
| 6,976,007 B1 * | 12/2005 | Boucher et al. | 705/26 |
| 2002/0073143 A1 * | 6/2002 | Edwards et al. | 709/203 |
| 2003/0140315 A1 * | 7/2003 | Blumberg et al. | 715/527 |
| 2003/0233190 A1 * | 12/2003 | Jones | 701/207 |

FOREIGN PATENT DOCUMENTS

JP  10069402 A  *  3/1998

OTHER PUBLICATIONS

Integrated Set of Design Verification Tools, IBM Technical Disclosure Bulletin, vol. 38, No. 05, May 1995, pp. 329-333.
Generic Processor Modeller, IBM Technical Disclosure Bulletin, Vo. 34, No. 5, Oct. 1991, pp. 341-344.

* cited by examiner fig. 1 fig. 2 fig. 3 fig. 4A fig. 4B fig. 5 fig. 6 fig. 7 fig. 8A fig. 8B

IN-QUEUE JOBS INFORMATION MONITORING AND FILTERING

TECHNICAL FIELD

This invention relates, in general, to administration of a distributed computing environment, and in particular, to enhanced monitoring of jobs in a queue of a distributed system.

BACKGROUND OF THE INVENTION

Distributed systems are scalable systems that are utilized in various situations, including those environments which require a high throughput of work, or continuous or nearly continuous availability of the system.

A distributed system that has the capability of sharing resources is referred to as a cluster. There is a need to keep track of information regarding jobs in a queue and job scheduling processes in the cluster. This information typically comes from different commands at different levels of detail. Further, this information is extremely dynamic and volatile.

Various discrete job monitoring commands exist today, such as the llq & llstatus commands of the System Testing LoadLeveler product for AIX, described in "IBM LoadLeveler for AIX, Using and Administering", Version 2, Release 1, publication no. SA22-7311-00 (October 1998) and "IBM Parallel System Support Programs for AIX: Command And Technical Reference", Version 3, Release 1, publication no. SA22-7351-00 (October 1998) which are hereby incorporated herein by reference in their entirety.

In view of the discrete nature of these existing monitoring commands, enhanced job monitoring techniques are desired, to facilitate, for example, the administration of cluster systems.

SUMMARY OF THE INVENTION

The shortcomings of the prior art are overcome and additional advantages are provided through the provision in one aspect of a method of monitoring jobs in a queue of a system. This method includes, for instance, collecting jobs information on jobs in a queue of a system, wherein the jobs information includes JobTracker information, the JobTracker information having jobs data on at least one job having a tracked job state and, for each job having the tracked job state, a time of entering the tracked job state; and employing or displaying the jobs information on the jobs in the queue.

In another aspect, a method of processing jobs information on jobs in a queue of a system is provided. This method includes, for instance, collecting jobs information on jobs in a queue of a system, the jobs information having multiple characteristics; and presenting the jobs information in one display window, wherein this one display window has multiple subwindows for displaying the jobs information, and at least some characteristics of these multiple characteristics are displayed in different subwindows of the multiple subwindows.

In yet another aspect, presented herein is a method of monitoring jobs in a queue of a system. This method includes providing a monitoring server application for collecting jobs information on jobs in a queue of a system, wherein the jobs information has multiple characteristics; and providing a client monitor application, wherein the client monitor application communicates with the monitoring server application and queries the monitoring server application for the jobs information on jobs in the queue of the system. By way of example, the client monitor application facilitates displaying the jobs information on the jobs in the queue of the system.

In still another aspect, a method of monitoring and trimming at least one filesystem of a system is provided. This method includes periodically collecting filesystem information from at least one filesystem of the system, wherein the filesystem information includes a filesystem usage; and automatically trimming the at least one filesystem of the system if the filesystem usage exceeds a predefined threshold. As one example, the term "filesystem" can refer to a UNIX directory tree.

Systems and computer program products corresponding to the above-summarized methods are also described and claimed herein.

Aspects of the present invention advantageously enable monitoring of a system from anywhere, either inside or outside of a system in part by separating the display and data collecting functions. Furthermore, the information on jobs in a system can be condensed into a single window, thereby facilitating user access to the jobs information. Moreover, this jobs information can be filtered by job state, e.g., to enable monitoring of unimportant jobs to be avoided, which allows a user to have quick access to essential or desired information for taking required actions in a timely manor.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctively claimed in the claims in the conclusion of the specification. The foregoing and other objects, features, and advantages of the invention are apparent from the following detailed description taken in conjunction with the accompanying drawing in which:

BEST MODE FOR CARRYING OUT THE INVENTION

In accordance with aspects of the present invention, a monitoring tool is provided for monitoring jobs in a queue of a system. The tool facilitates monitoring a state of one or more jobs in a queue of the system, tracking jobs in the queue of the system, and presenting jobs information on jobs in the queue of the system.

Figure 1:
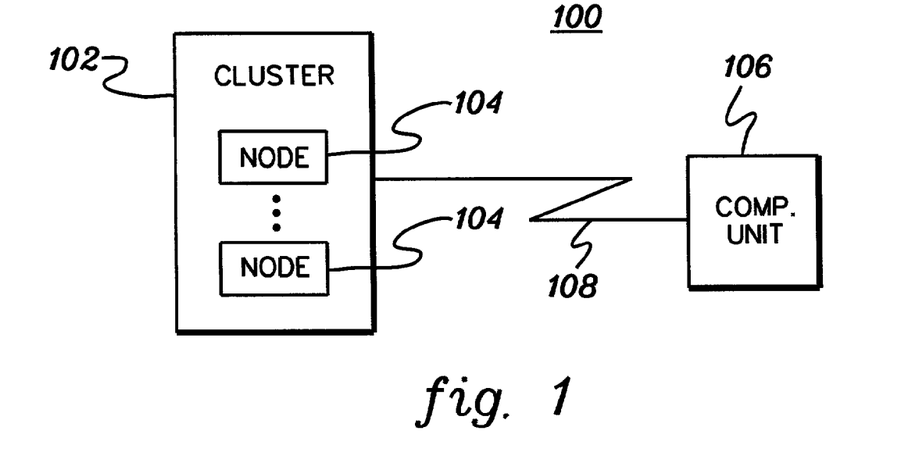
FIG. 1 depicts one example of a system incorporating and using aspects of the present invention.

Before describing embodiments of the monitoring tool, one embodiment of a computing environment incorporating and using the capabilities of the present invention is described with reference to FIG. 1. Environment 100 includes, for instance, a cluster 102 (such as an RS/6000 SP system offered by International Business Machines Corporation, Armonk, N.Y.) having a plurality of nodes 104. Nodes 104 share resources and collaborate with each other in performing system tasks. Environment 100 also includes one or more computing units 106. Each computing unit 106 includes, for example, one or more central processing units, memory and one or more input/output devices, as is well known in the art. Each node of the cluster is, for instance, a RISC/6000 computer running AIX, a UNIX based operating system. In one embodiment, cluster 102 is running a System Testing LoadLeveler routine, which is described in the above-incorporated IBM publications.

At least one node 104 of cluster 102 is running a monitoring server application such as described hereinbelow.

Cluster 102 is coupled to one or more computing units 106 via a standard connections 108, such as a wire connection, token ring, ethernet or other connection. One communications protocol which could be used by one or more of these connections is TCP/IP.

The above-described computing environment and computing units are only offered as examples. The present invention can be incorporated in or used with many types of computing units, computers, processors, nodes, systems, workstations and/or environments without departing from the spirit of the present invention. For example, one or more of the units could be based on a UNIX architecture or may include an Intel PC architecture. Additionally, while some of the embodiments described herein are discussed in relation to computer units separate from the cluster, such embodiments are only examples. Computing units 106 could be either part of the cluster or separate from the cluster. Also, other types of computing environments could benefit from the present invention, and are thus considered a part of the present invention.

Figure 2:
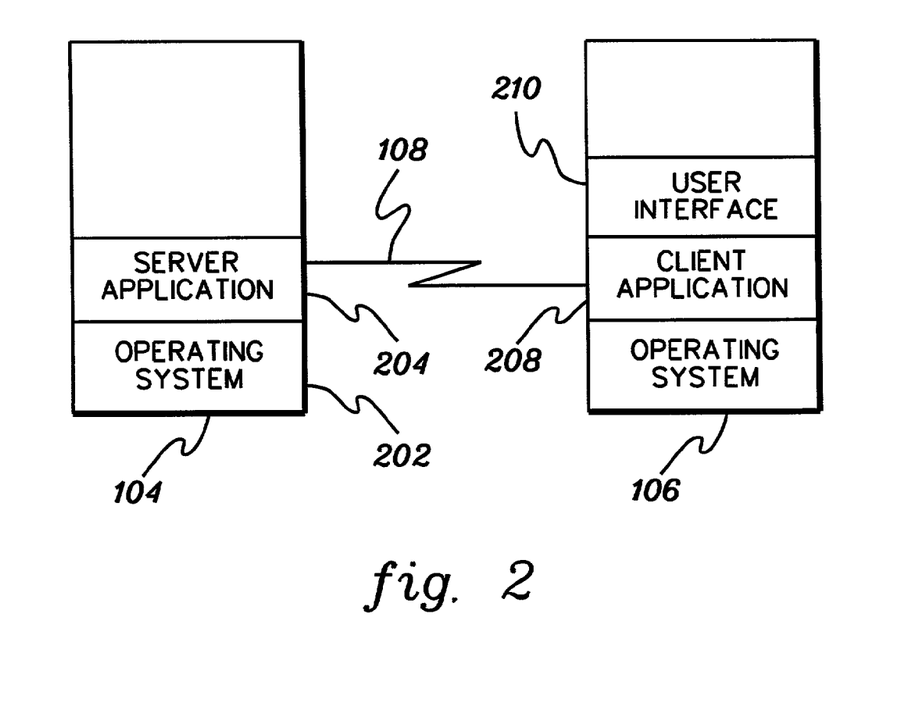
FIG. 2 depicts further details of components of FIG. 1, in accordance with an aspect of the present invention.

One embodiment of node 104 and computing unit 106 is shown in FIG. 2. In this embodiment, node 104 is running an operating system instance 202. Executing on the operating system 202 is, for instance, the monitoring server application 204. In accordance with an aspect of the present invention, the monitoring server application 204 collects jobs information on the jobs in a queue of a system such as cluster 102, as explained below.

Computing unit 106 includes an operating system instance 206, such as the OS/390, AIX or MVS Operating Systems offered by International Business Machines Corporation, Armonk, N.Y. Running on operating system 206 is, for instance, a client monitor application 208. As shown, client monitor application 208 communicates with monitoring server application 204 via a standard connection 108.

In one embodiment, the monitoring server application and the client monitor application are written in Java to be system independent.

Client monitor application 208 also includes a graphical user interface 210, for example, for displaying information obtained from monitoring server application 204 over connection 108. Interface 210 provides a user with monitored information, as well as a means for interacting with the client monitor application.

Figure 3:
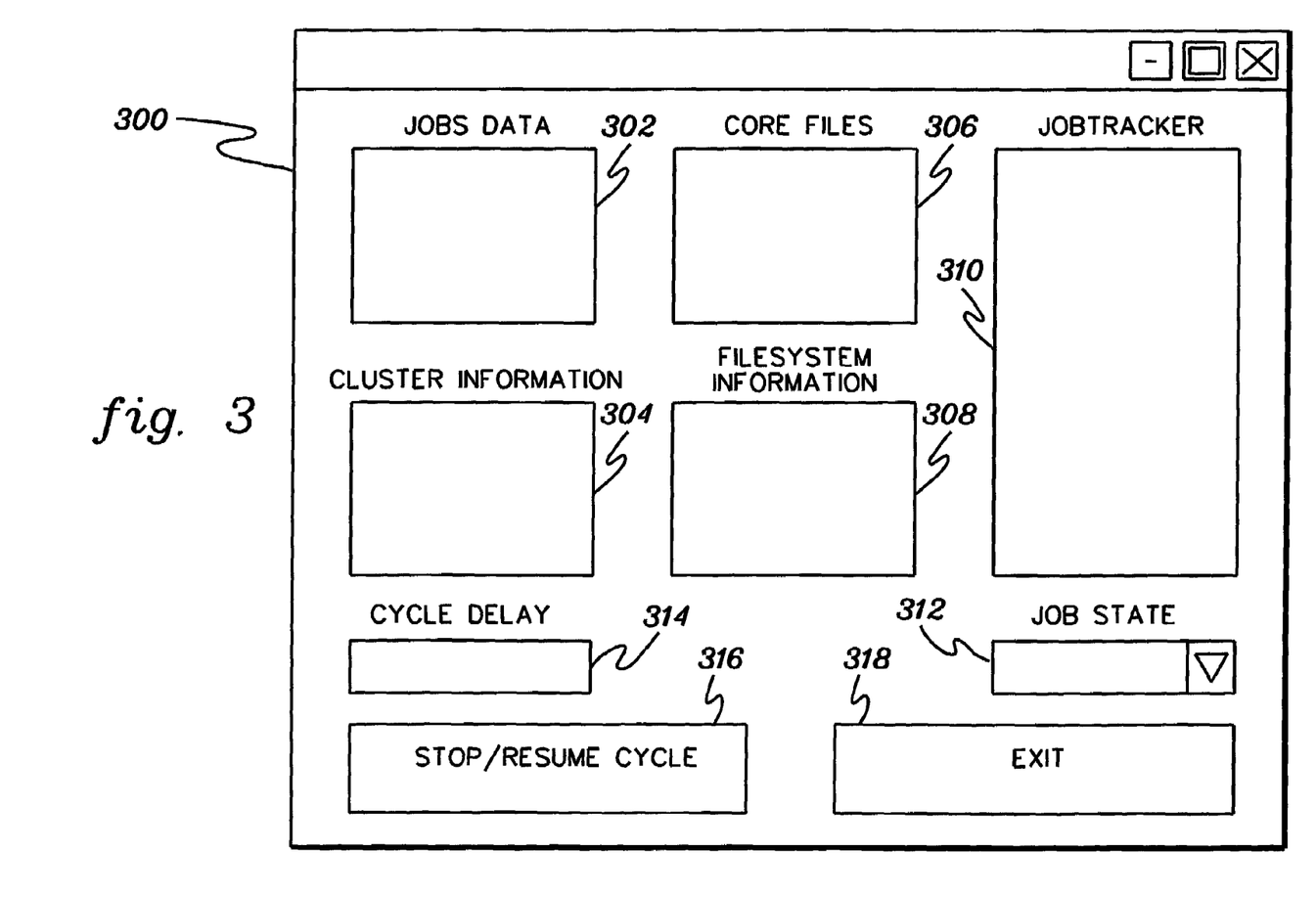
FIG. 3 depicts one embodiment of a user interface for displaying jobs information used by a client application, in accordance with an aspect of the present invention.

One embodiment of a graphical user interface 210 is depicted in FIG. 3. This user interface includes a single window 300 encompassing the display screen and comprising multiple subwindows for displaying multiple types or characteristics of jobs information. In one embodiment, window 300 includes a subwindow 302 for displaying "jobs data" on the jobs in the queue of the system. As used herein, the jobs data includes at least some of job ID, job owner, job starting time, job priority, job state, job class, and name of the node where the job is running.

Window 300 further includes a subwindow 304 for displaying "cluster information". As used herein, cluster information includes for a node of the system at least some of a name of the node, status of a scheduler, number of in-queue jobs, number of active jobs, average load, idle time, type of node architecture and operating system running on the node, as examples.

A subwindow 306 is provided for displaying "core files information". Core files information is used herein to include, for instance, a list of core files found on the system. Core files, also known as core dump files, contain a snapshot of memory contents. In one example, core files information is created by the operating system when one of the jobs executing thereon crashes. In another example, core files can be used for debugging an application. Presence of core files often signifies problems with the system. One embodiment of logic associated with obtaining core files information is described below with reference to FIG. 6.

A subwindow 308 of window 300 is provided for displaying "filesystem information". In one embodiment, the system contains at least one filesystem. Filesystem characteristics include, for example, size of the filesystem in bytes, size of the filesystem in blocks, size of a block of the filesystem, space used in bytes and space used in blocks. In one example, filesystem information also includes percentage of used space on the filesystem. Filesystem information can be collected on filesystems used for temporary files and filesystems containing working directories. In another embodiment, when filesystem usage is higher than a predefined threshold, the filesystem can be trimmed. One embodiment of logic for obtaining filesystem information and filesystem trimming are described further below with reference to FIG. 7.

Window 300 also includes a subwindow 310 for displaying JobTracker information. As used herein, JobTracker information contains information on jobs having a selected state. Jobs having other than the selected state are filtered out. In one embodiment, a list of selectable states can be predefined, and the tracked job state can be selected via a control element 312, which (in one example), comprises a selected state of the list of selectable states. JobTracker information displayed in subwindow 310 can be updated upon selection of a different tracked job state in control element 312. One embodiment of logic associated with obtaining and displaying JobTracker information is described further below with reference to FIG. 8.

Window 300 also includes a subwindow 314, where a "cycle delay" can be entered. In one embodiment, cycle delay is defined as a time period between which contents (i.e., monitored information) of one or more subwindows of window 300 are refreshed.

Two additional control elements 316 and 318 are also provided in window 300. Control element 316 can be set to a RESUME state or a STOP state. If control element 316 is toggled from RESUME to STOP, all subwindows of window 300 stop refreshing. This might be done to enable a user time to analyze displayed data statically. Upon toggling control element 316 into RESUME state, the dynamic monitoring process continues.

Control element 318 can be set to EXIT. Upon setting control element 318 to EXIT, the client monitor application disconnects from the monitoring server application and exits.

Generally stated, presented herein is a technique of monitoring jobs in a queue of a system. One detailed logic embodiment of such a technique is described below with reference to FIGS. 4A & 4B.

Figure 4A:
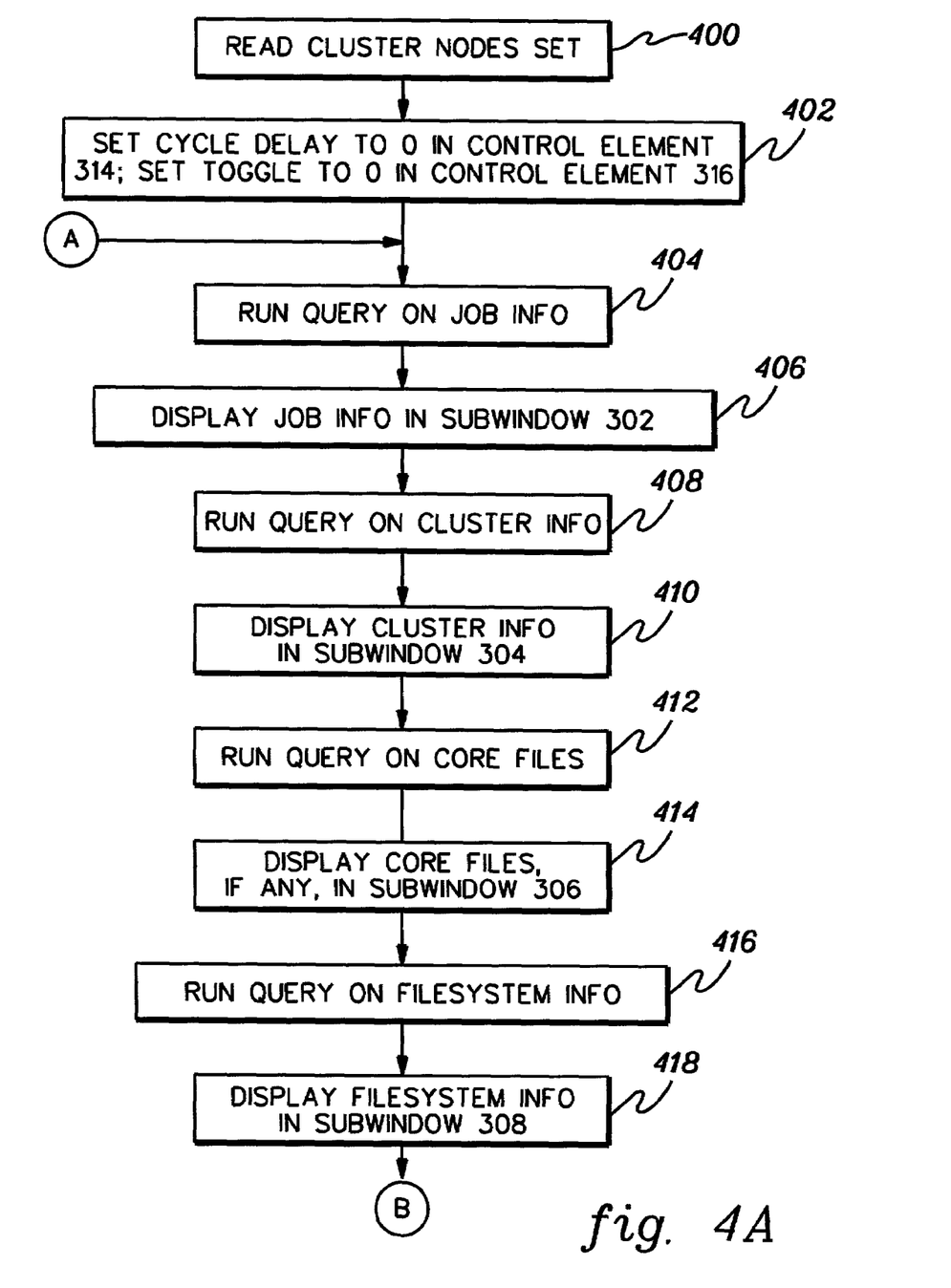
FIGS. 4A and 4B depict one example of logic used by a monitoring process, in accordance with an aspect of the present invention.

Initially, the monitoring server application determines a set of cluster nodes which are executing. Nodes that do not respond are filtered out from the set, STEP 400. The cycle delay value is set to 0 and control element 316 is set to RESUME, STEP 402.

Thereafter, the client monitor application sends a query on jobs data to the monitoring server application over connection 108. In one example, upon receiving the request, the monitoring server application runs at least one operating system command, such as llq from the IBM LoadLeveler for AIX subsystem (described in the above-incorporated references) to retrieve jobs data on the jobs in a queue of the system. After the jobs data is obtained, the monitoring server application sends the information to the client monitor application, STEP 404.

Upon receiving jobs data from the monitoring server application, the client monitor application displays the information in subwindow 302, STEP 406.

Subsequently, the client monitor application sends a query on cluster information to the monitoring server application over connection 108. In one example, upon receiving this request, the monitoring server application runs an operating system command, such as llstatus from IBM LoadLeveler for AIX subsystem (described in above-incorporated reference), to retrieve the cluster information on the jobs in the queue of the system.

After the cluster information is obtained, the monitoring server application sends the information to the client monitor application, STEP 408; and upon receiving the cluster information from the monitoring server application, the client monitor application displays the information, STEP 410.

The client monitor application next queries the monitoring server application on core files information. In one embodiment, upon receiving the request, the monitoring server application runs a CoreFileChecker script which generates a list of core files found on the system. One embodiment of a CoreFileChecker script logic is described further below with reference to FIG. 6. Once generated, the list of core files is sent to the client monitor application, STEP 412.

Upon receiving core files information from the monitoring server application, the client monitor application displays the information in subwindow 306 of the graphical user interface, STEP 414.

Processing continues with the client monitor application sending a query on filesystem information to the monitoring server application. Upon receiving this request, the monitoring server application runs operating system commands to retrieve the filesystem information. One example of logic associated with obtaining filesystem information, as well as an example of operating system commands which can be used for this purpose, is described below with reference to FIG. 7. After the filesystem information is obtained, the monitoring server application sends the information to the client monitor application, STEP 416.

Upon receiving filesystem information from the monitoring server application, the client monitor application displays the information in subwindow 308 of the user interface, STEP 418.

Figure 4B:
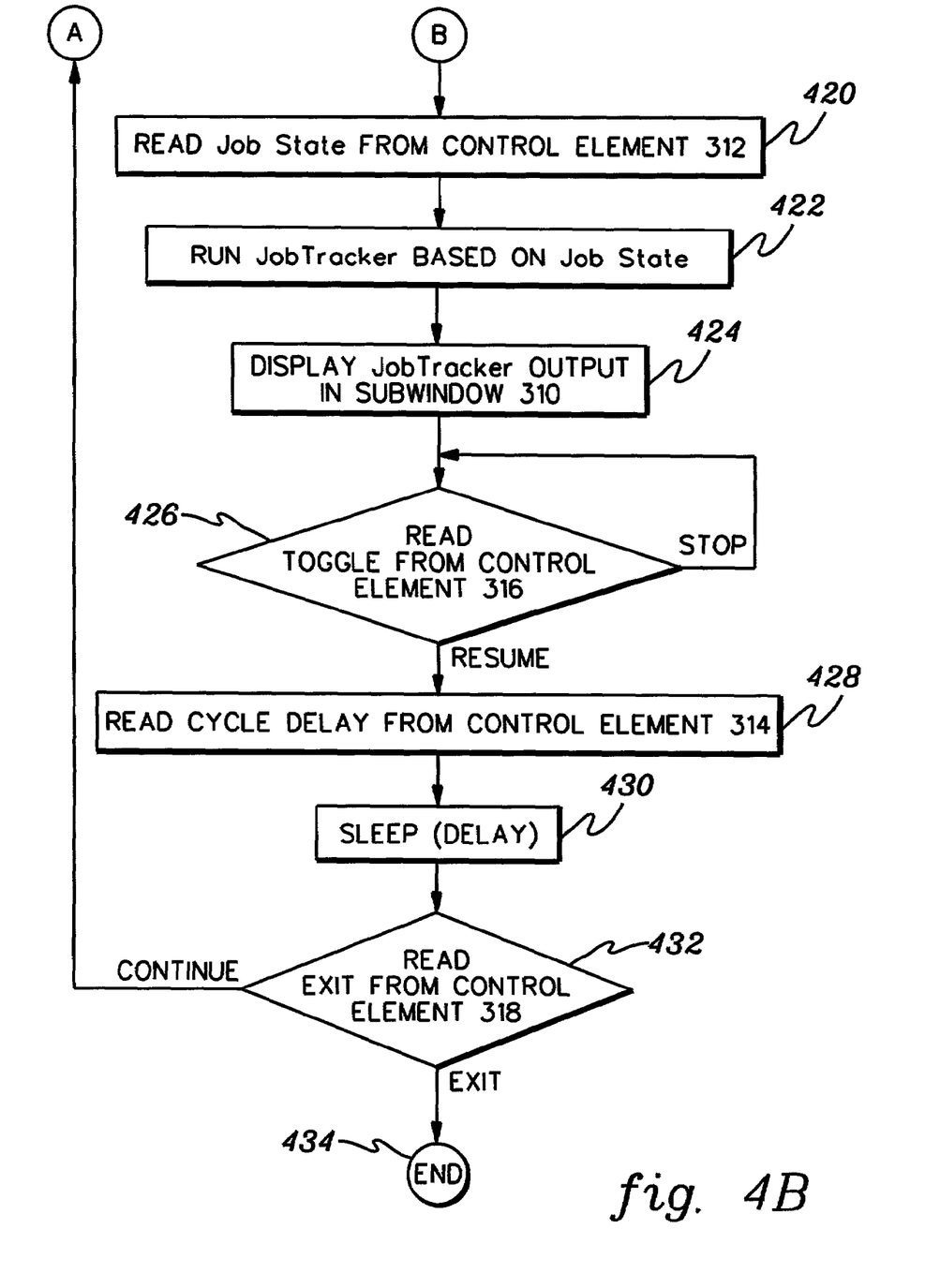

Thereafter, as shown in FIG. 4B, the job state is read from control element 312 (previously set by a user), STEP 420, and the client monitor application sends a request to the monitoring server application to run the JobTracker routine based on the job state in control element 312. One embodiment of logic associated with this JobTracker function is described below with reference to FIG. 8. Upon receiving the request, the monitoring server application runs the JobTracker logic based on the job state, and returns output thereof to the client monitor application, STEP 422.

Upon receiving JobTracker information from the monitoring server application, the client monitor application displays the information in subwindow 310 of the user interface, STEP 424.

Processing next determines whether control element 314 of the window 300 is set to RESUME, STEP 426. If element 314 is set to RESUME, then processing continues with STEP 428, otherwise processing stops until control element 314 is toggled to RESUME.

Cycle delay time is also read from subwindow 314 of the window 300, STEP 428. Monitor processing is delayed between cycles for the cycle delay time determined on the previous step, STEP 430.

Next, a determination is made whether control element 318 of window 300 is set to EXIT, STEP 432. If so, then processing is stopped and the application exits. If not, processing continues with the monitoring cycle repeating until control element 318 is toggled to STOP (see STEP 404, FIG. 4A)

Certain aspects of the monitor logic presented herein are described in detail below with reference to FIGS. 5–8.

Figure 5:
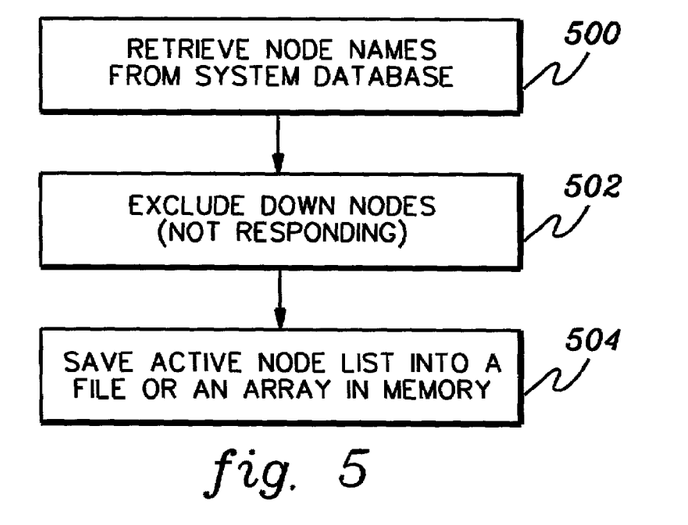
FIG. 5 depicts one embodiment of logic associated with reading a cluster nodes set, in accordance with an aspect of the present invention.

To monitor jobs in a system, a set of nodes where the jobs are running is first obtained. FIG. 5 depicts one embodiment of logic associated with reading a set of nodes.

Initially, node names are retrieved from a system database of the cluster, STEP 500. In one example, the cluster is running AIX and Parallel System Support Programs. In this example, function SDRGetObject( ) described in the above-incorporated references can be used. The resulting set of node names is used further to determine "up" nodes, i.e., nodes that are active and respond to commands, as described below.

Down nodes are excluded from the set, obtained in the previous step, STEP 502. In one example, if the cluster is running a UNIX-based operating system, this can be achieved by sending a 'dsh-av' command to nodes in the set. If a node does not respond within a timeout interval, the node is considered to be down and is excluded from the set.

The resulting set of nodes is stored into a file or an array in memory, STEP 504.

Next, jobs data is retrieved. As noted, the client monitor application sends a request for jobs data to the monitoring server application. Then, in one embodiment, the monitoring server application runs an operating system command to obtain the jobs data for one or more jobs in the queue of a system. As an example, the system could be running System Testing LoadLeveler, and a command for obtaining the jobs data might be 'llq', described in the above-incorporated references. Once obtained, the jobs data is forwarded to the client monitor application, for example, for presentation in a corresponding subwindow of the user interface.

A next step (in one embodiment) is to obtain cluster information. This can be accomplished by sending a query on cluster information from the client monitor application to the monitoring server application. In one embodiment, the cluster is running System Testing LoadLeveler. After receiving this query, the monitoring server application runs a 'llstatus' command (described in the above-incorporated reference) to obtain the cluster information. The cluster information is then sent to the client monitor application for display in a corresponding subwindow of the user interface.

As noted, the next information which can be acquired from the system is information about core files on the system. As one example, working directories may be checked for core files. In another example, name and path of each core file may be needed. In yet another example, additional information may be required, such as size and a timestamp of the core file. One example of logic associated with tracking core file(s) is presented in FIG. 6.

Figure 6:
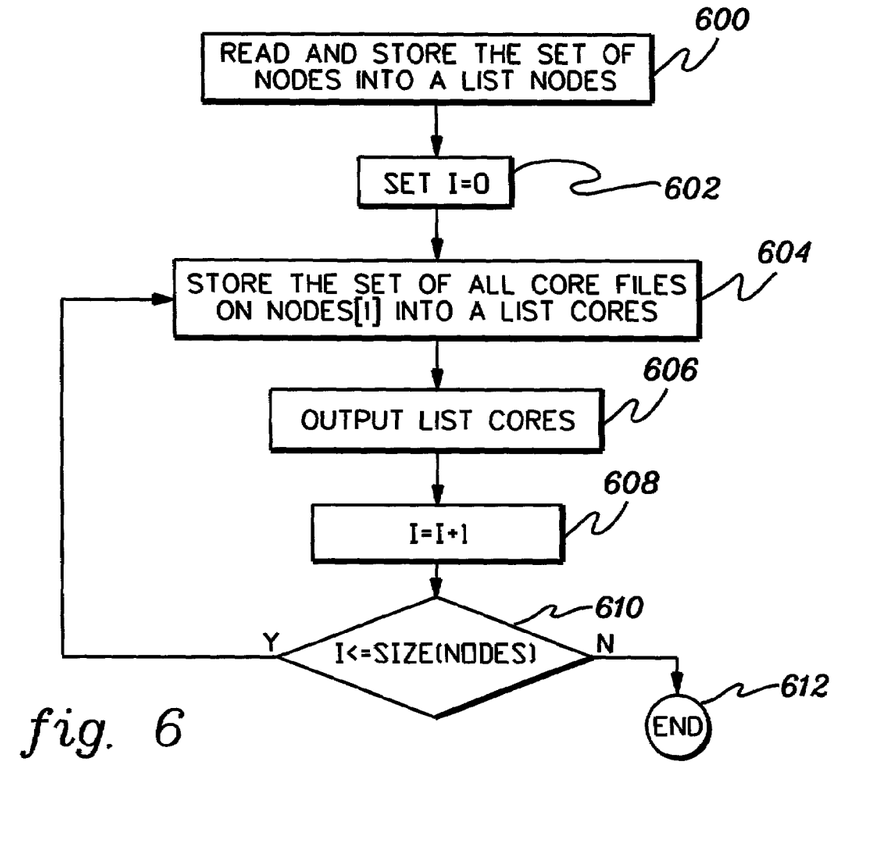
FIG. 6 depicts one embodiment of logic associated with tracking core files, in accordance with an aspect of the present invention.

Referring to FIG. 6, the set of nodes where jobs of a system are running is initially stored into a list NODES, STEP 600. The set of nodes are retrieved from the system database (see FIG. 5). Next, a counter I is set to zero, STEP 602. Counter I is used to iterate through the list NODES.

Then, node NODES[I] is searched for core files in the working directories; and the list of all core files found on the node NODES[I] is stored into a list CORES, STEP 604. In one embodiment, the cluster is running a UNIX-based operating system, and a core file contains the string "core" in the file name and the standard UNIX command 'find' can be used for searching core files. Subsequently, list CORES is outputted, STEP 606. In one example, list CORES is outputted to the standard output STDOUT defined in the operating system. In another example, list CORES is outputted to a binary file.

Next, counter I is incremented, STEP 608, and the value of the counter is compared to the number of nodes in the list NODES, STEP 610. If counter I is less than the number of nodes in the list NODES, the search repeats on the next node of the list NODES, STEP 604. If counter I is equal or greater than the number of nodes in the list NODES, then all nodes in the list have been searched and searching stops, STEP 612.

As one embodiment, the above logic could be implemented in a CoreFileChecker script. The monitoring server application would start the CoreFileChecker script, read output of the CoreFileChecker script and send the output to the client monitor application. Upon receiving this output, the client monitor application would (in one example) present the information in the corresponding subwindow of the user interface.

In a further embodiment, a next characteristic of the system which can be obtained is filesystem information. In one example, filesystems used for temporary and working files are monitored. Further, if a filesystem usage is higher than a predefined threshold, then that filesystem can be automatically trimmed. As used herein, trimming refers to deleting a predefined percentage of files in the filesystem, e.g., beginning with the oldest files. One embodiment of filesystem monitoring logic is described below with reference to FIG. 7.

Figure 7:
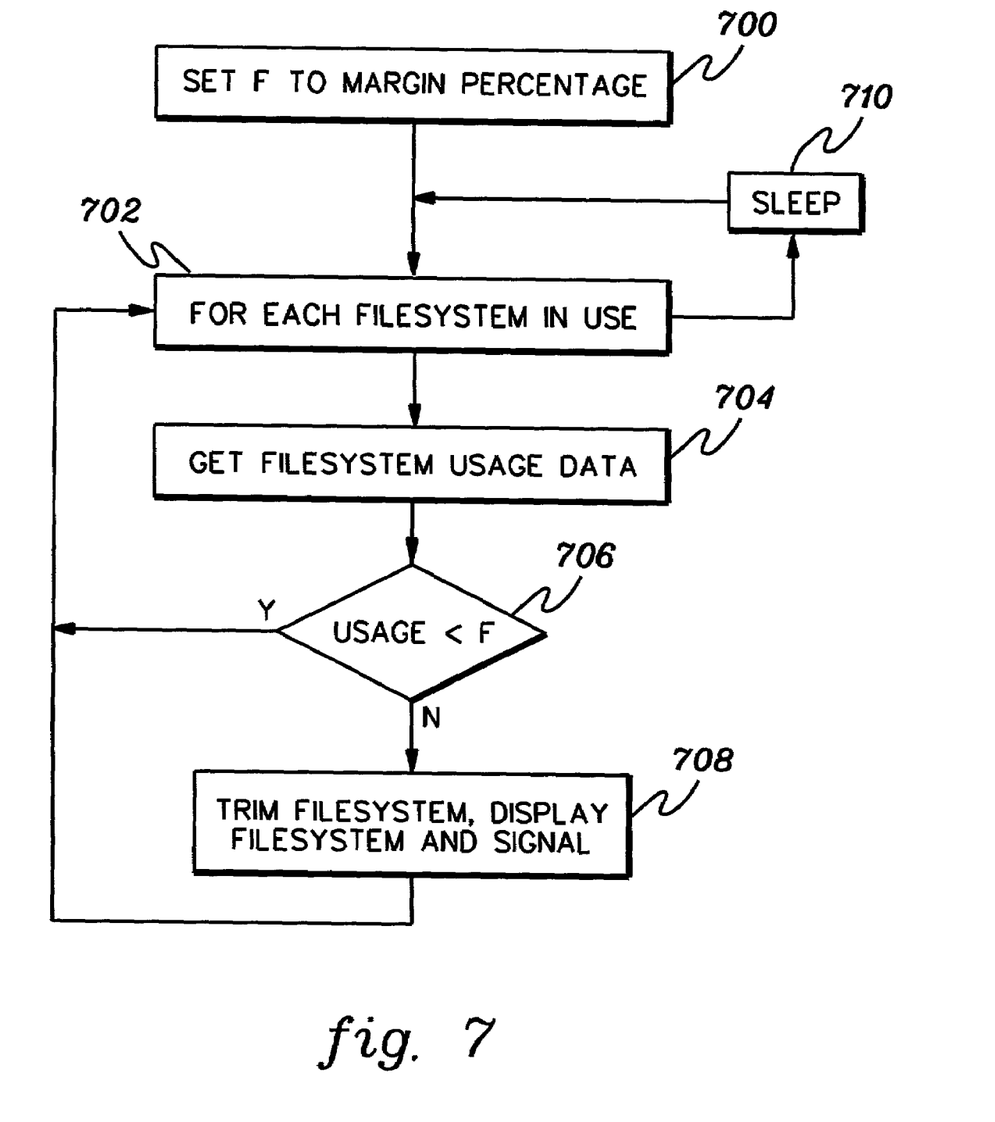
FIG. 7 depicts one embodiment of logic associated with monitoring and trimming a filesystem, in accordance with an aspect of the present invention.

Initially, a margin percentage F is set to a predefined threshold value above which trimming is to occur, STEP 700.

Next, for each filesystem in use the same routine is repeated, STEP 702. Once the filesystems have been tested, processing pauses for a predefined time before continuing with STEP 702 to again test the filesystems, STEP 710. If filesystems remain to be tested, processing continues with STEP 704, i.e., filesystem usage data is obtained. In one example, a cluster environment may be running UNIX-based operating system, and the standard UNIX command 'df' could be used to obtain filesystem usage data.

The filesystem usage data is next compared to margin percentage F, STEP 706. If filesystem usage is less than F, then processing continues with STEP 702, and a next unchecked filesystem is tested. If filesystem usage is greater than or equal to F, then the filesystem is trimmed and this information is displayed, STEP 708. In one embodiment, the client monitor application may emit a sound signal when a filesystem is trimmed. Then, processing continues with STEP 702.

In one embodiment, the above logic can be is implemented into a script. The monitoring server application would run the script after receiving a query on filesystem information, and then read output of the script. The output of the script is sent to the client monitor application, for example, for presentation in the corresponding subwindow of the user interface.

In a still further aspect, JobTracker information on jobs having a selected state can be monitored. In one embodiment, job state is chosen using the user interface of the client monitor application.

Logic associated with tracking jobs in a queue of a system is described below with reference to FIGS. 8A and 8B. As one example, this logic could be implemented in a script called JobTracker.

Figure 8A:
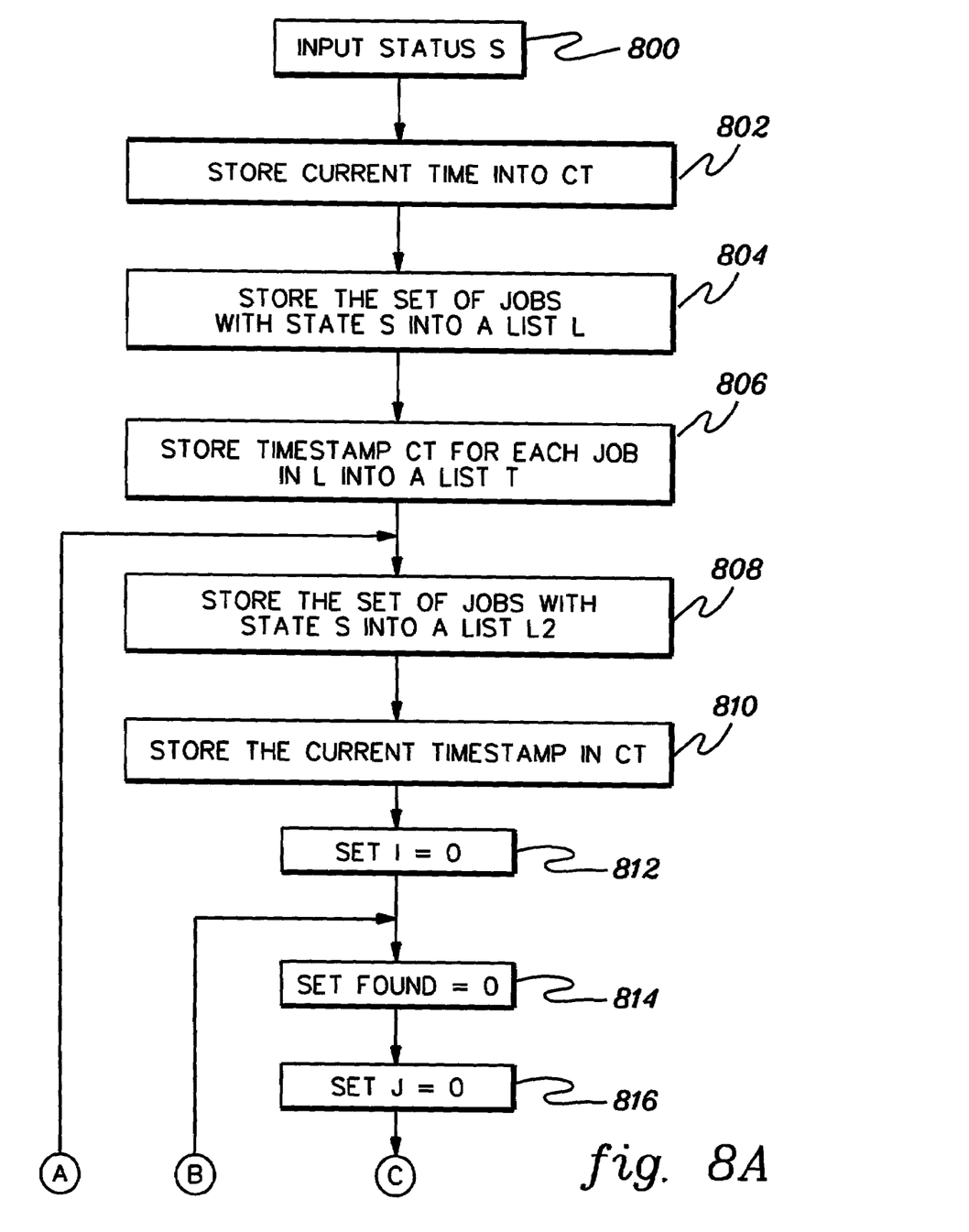
FIGS. 8A and 8B depict one embodiment of logic associated with a JobTracker function, in accordance with an aspect of the present invention.
Figure 8B:
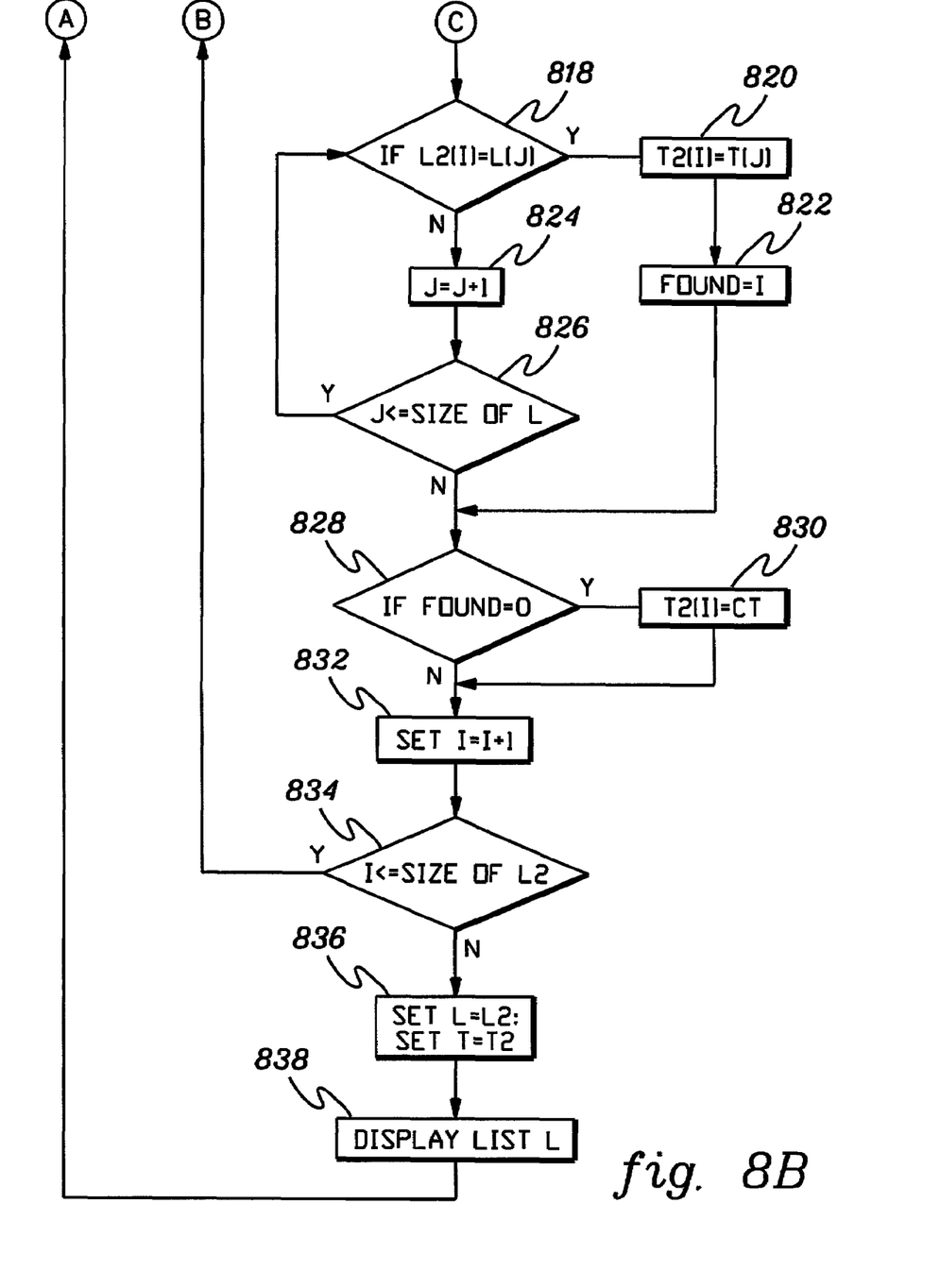

Initially, the client monitor application queries the monitoring server application for jobs data on the jobs in a queue of the system having a user selected state S, STEP 800, FIG. 8A. A current time is then stored into a variable CT, STEP 802, and the set of jobs having state S is stored into a list L, STEP 804. The set of jobs having state S can be derived from the jobs data, which (as noted above) includes a state parameter for each job. Subsequently, timestamp CT is stored for each job in list L into a list T, STEP 806. Lists L and T are of the same length and elements in list T correspond to elements in list L, i.e. T[i] is a timestamp of the job L[i].

Next, the set of jobs having state S is stored into a list L2, STEP 808, and a current timestamp is stored in CT, STEP 810. Counter I is set to zero, STEP 812, an indicator of a job match FOUND is set to zero, STEP 814, and a counter J is set to zero, STEP 816.

Subsequently, names of jobs L[J] and L2[I] are compared, INQUIRY 818. If names are the same, then the job is already in the list of jobs with the tracked job state, and processing continues with STEP 820, FIG. 8B, i.e., a timestamp T2[I] is set to T[J] and FOUND is set to one, STEP 822. Processing then continues with STEP 828.

If L[J] is different from L2[I], counter J is incremented, STEP 824, and counter J is compared to the size of L, INQUIRY 826. If J is less than or equal to the size of L, then processing continues with STEP 818; otherwise, all jobs in the list L have been checked, the job L2[I] is a new job having the tracked job state, and processing continues with STEP 828, i.e., an indicator of job match FOUND is checked.

If FOUND is equal to zero, INQUIRY 828, then a new job having the tracked job state has been found and its timestamp T2[I] is set to CT, STEP 830. Thereafter, or if FOUND is not equal to zero, processing increments counter I, STEP 832.

Next, counter I is checked, INQUIRY 834. If I is less than or equal to the size of L2, then processing continues with STEP 814, FIG. 8A. Thus, a timestamp of each new job with state S is stored. Otherwise, all jobs in the list L2 have been checked and processing continues with STEP 836, i.e., list L is set to equal list L2 and list T is set to equal list T2. Next, lists L and T are outputted to the client monitor application, STEP 838, and processing continues with STEP 808, FIG. 8A. List L in STEP 838 contains jobs currently having state S and list T contains timestamps corresponding to the jobs in L.

Described above are various aspects of monitoring jobs in a queue of a distributed system in accordance with the present invention. A tool for monitoring jobs in a queue of a system as well as techniques for monitoring jobs, are provided. The various techniques described herein are applicable to single systems, homogeneous systems, as well as heterogenous systems. As one example, the client monitor application and the monitoring server application can be run on the same physical machine.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of monitoring jobs in a queue of a distributed system, said method comprising:
responsive to a request by a client monitor application for jobs information on computer jobs in a queue having a user selected state of execution, wherein computer jobs in the queue are in any one of a plurality of possible states of execution, collecting by a monitoring server application jobs information on a set of computer jobs in the queue of a distributed system having the user selected state, said jobs information comprising JobTracker information for the set of computer jobs, said JobTracker information including jobs data on each computer job of the set of computer jobs having the user selected, tracked job state and, for each job having said tracked job state, a time of entering the tracked job state;
employing or displaying, by the client monitor application, said jobs information for the set of computer jobs in the queue having the user selected state;
wherein said jobs information comprises multiple characteristics, said multiple characteristics including said JobTracker information, and at least one of jobs data, filesystem information, cluster information and core files information, said jobs data comprising for each job in a queue at least some of job id, job owner, job starting time, job state, job priority, job class, and name of node where the job is running, said filesystem information including filesystem usage, said cluster information including for each node of said system, a name of the node, status of a scheduler, number of in-queue jobs, number of active jobs, average load, idle time, type of node architecture and operating system running on the node, and said core files information including a list of core files;
wherein said collecting jobs information further comprises:
reading a set of nodes of said system;
querying nodes of said set of nodes on said jobs information; and
retrieving from said system results of said querying;
wherein said reading comprises:
retrieving from said system a full set of nodes of said system; and
removing down nodes from said full set of nodes, wherein said down nodes include nodes that fail to respond to operating system commands within a predefined period of time;
wherein said querying comprises at least some of:
querying nodes in said set of nodes on jobs information;
querying nodes in said set of nodes on JobTracker information;
querying nodes in said set of nodes on filesystem information;
querying nodes in said set of nodes on cluster information; and
querying nodes in said set of nodes on core files information; and
wherein said querying nodes on JobTracker information comprises:
selecting said tracked job state from a predefined list of job states; and
producing a list of jobs in a queue of said system having said tracked job state.

2. The method of claim 1, further comprising user selecting said tracked job state from a predefined list of job states, said predefined list comprising at least some states of "waiting", "running", "pending" and "held".

3. The method of claim 1, wherein said producing a list of jobs comprises:
retrieving jobs information on at least one job in a queue and storing said jobs information into a list, wherein said jobs information includes a current timestamp and job state on said at least one job;
removing from said list jobs having a state different from said tracked job state; and
periodically updating said list by adding jobs that acquire said tracked job state after a most recent update of said list, and by removing from said list jobs that change job state after the most recent update of said list.

4. The method of claim 1, wherein said employing or displaying said jobs information comprises at least one of storing said jobs information, using said jobs information as an input of a computer program or a script, or presenting said jobs information in a single display window for viewing thereof.

5. A computer-implemented monitor system for monitoring jobs in a queue of a distributed system, said monitor system comprising:

responsive to a request by a client monitor application for jobs information on computer jobs in a queue having a user selected state of execution, wherein computer jobs in the queue are in any one of a plurality of possible states of execution, means for collecting by a monitoring server application jobs information on a set of computer jobs in the queue of a distributed system having the user selected state, said jobs information comprising JobTracker information for the set of computer jobs, said JobTracker information including jobs data on each computer job of the set of computer jobs having the user selected, tracked job state and, for each job having said tracked job state, a time of entering the tracked job state;

means for employing or displaying, by the client monitor application, said jobs information for the set of computer jobs in the queue having the user selected state;

wherein said jobs information comprises multiple characteristics, said multiple characteristics including said JobTracker information, and at least one of jobs data, file system information, cluster information and core files information, said jobs data comprising for each job in a queue at least some of job id, job owner, job starting time, job state, job priority, job class, and name of node where the job is running, said filesystem information including filesystem usage, said cluster information including for each node of said system, a name of the node, status of a scheduler, number of in-queue jobs, number of active jobs, average load, idle time, type of node architecture and operating system running on the node, and said core files information including a list of core files;

wherein said means for collecting jobs information further comprises:
 means for reading a set of nodes of said system;
 means for querying nodes of said set of nodes on said jobs information; and
 means for retrieving from said system results of said means for querying;

wherein said means for reading comprises:
 means for retrieving from said system a full set of nodes of said system; and
 means for removing down nodes from said full set of nodes, wherein said down nodes include nodes that fail to respond to operating system commands within a predefined period of time;

wherein said means for querying comprises at least some of:
 means for querying nodes in said set of nodes on jobs information;
 means for querying nodes in said set of nodes on JobTracker information;
 means for querying nodes in said set of nodes on filesystem information;
 means for querying nodes in said set of nodes on cluster information; and
 means for querying nodes in said set of nodes on core files information; and wherein said means for querying nodes on JobTracker information comprises:

means for selecting said tracked job state from a predefined list of job states; and
 means for producing a list of jobs in a queue of said system having said tracked job state.

6. The monitor system of claim 5, further comprising means for user selecting said tracked job state from a predefined list, said predefined list comprising at least some states of "waiting", "running", "pending" and "held".

7. The monitor system of claim 5, wherein said means for producing a list of jobs comprises:
 means for retrieving jobs information on at least one job in a queue and means for storing said jobs information into a list, wherein said jobs information includes a current timestamp and job state on said at least one job;
 means for removing from said list jobs having a state different from said tracked job state; and
 means for periodically updating said list by adding jobs that acquire said tracked job state after a most recent update of said list, and by removing from said list jobs that change job state after the most recent update of said list.

8. The monitor system of claim 5, wherein said means for employing or displaying said jobs information comprises at least one of means for storing said jobs information, means for using said jobs information as an input of a computer program or a script, or means for presenting said jobs information in a single display window for viewing thereof.

9. At least one program storage device readable by a computer, tangibly embodying at least one program of instructions executable by the computer to perform a method of monitoring jobs in a queue of a distributed system, comprising:

responsive to a request by a client monitor application for jobs information on computer jobs in a queue having a user selected state of execution, wherein computer jobs in the queue are in any one of a plurality of possible states of execution, collecting by a monitoring server application jobs information on a set of computer jobs in the queue of a distributed system having the user selected state, said jobs information comprising JobTracker information for the set of computer jobs, said JobTracker information including jobs data on each computer job of the set of computer jobs having the user selected, tracked job state and, for each job having said tracked job state, a time of entering the tracked job state;

employing or displaying, by the client monitor application, said jobs information for the set of computer jobs in the queue having the user selected state;

wherein said jobs information comprises multiple characteristics, said multiple characteristics including said JobTracker information, and at least one of jobs data, filesystem information, cluster information and core files information, said jobs data comprising for each job in a queue at least some of job id, job owner, job starting time, job state, job priority, job class, and name of node where the job is running, said filesystem information including filesystem usage, said cluster information including for each node of said system, a name of the node, status of a scheduler, number of in-queue jobs, number of active jobs, average load, idle time, type of node architecture and operating system running on the node, and said core files information including a list of core files;

wherein said collecting jobs information further comprises:
 reading a set of nodes of said system;

querying nodes of said set of nodes on said jobs information; and retrieving from said system results of said querying;

wherein said reading comprises:

retrieving from said system a full set of nodes of said system; and removing down nodes from said full set of nodes, wherein said down nodes include nodes that fail to respond to operating system commands within a predefined period of time;

wherein said querying comprises at least some of:

querying nodes in said set of nodes on jobs information;

querying nodes in said set of nodes on JobTracker information;

querying nodes in said set of nodes on filesystem information;

querying nodes in said set of nodes on cluster information; and querying nodes in said set of nodes on core files information; and wherein said querying nodes on JobTracker information comprises:

selecting said tracked job state from a predefined list of job states; and producing a list of jobs in a queue of said system having said tracked job state.

* * * * *